United States Patent
Fraga Trillo et al.

(10) Patent No.: US 8,680,195 B2
(45) Date of Patent: Mar. 25, 2014

(54) HYDROGENATED RUBBER GRADE FOR THE IMPROVEMENT OF HIGH-TEMPERATURE PROPERTIES

(75) Inventors: Luisa Mª Fraga Trillo, Madrid (ES); Enrique Alonso Guerrero, Santander (ES)

(73) Assignee: Dynasol Elastomeros, S.A., Madrid (ES)

( * ) Notice: Subject to any disclaimer, the term of this patent is extended or adjusted under 35 U.S.C. 154(b) by 0 days.

(21) Appl. No.: 13/501,225

(22) PCT Filed: Oct. 16, 2009

(86) PCT No.: PCT/ES2009/070444
§ 371 (c)(1),
(2), (4) Date: Jul. 3, 2012

(87) PCT Pub. No.: WO2011/045450
PCT Pub. Date: Apr. 21, 2011

(65) Prior Publication Data
US 2012/0270991 A1     Oct. 25, 2012

(51) Int. Cl.
*C08L 53/00* (2006.01)
*C08F 279/00* (2006.01)
*B29B 7/00* (2006.01)
*B29C 45/00* (2006.01)

(52) U.S. Cl.
USPC ................ 524/505; 525/313; 264/328.1

(58) Field of Classification Search
USPC ................ 524/505; 523/313; 264/328.1
See application file for complete search history.

(56) References Cited

U.S. PATENT DOCUMENTS

2003/0083422 A1   5/2003   Chen
2007/0232747 A1*  10/2007  Maris et al. ............ 524/505

FOREIGN PATENT DOCUMENTS

EP    1304356 A1   4/2003
EP    1 894 974 A1  3/2008

OTHER PUBLICATIONS

International Search Report issued in PCT/ES2009/070444 on Sep. 14, 2010.

\* cited by examiner

*Primary Examiner* — Ling Choi
*Assistant Examiner* — Catherine S Branch
(74) *Attorney, Agent, or Firm* — Blank Rome LLP

(57) ABSTRACT

The present invention relates to an elastomeric thermoplastic composition characterized in that it has compression resistance at temperatures between 20° C. and 100° C., comprising hydrogenated styrene-butadiene block copolymers, and to the copolymers that form said composition. Furthermore, the present invention relates to a product that has been obtained by means of the molding or extrusion of the composition described above.

30 Claims, No Drawings

HYDROGENATED RUBBER GRADE FOR THE IMPROVEMENT OF HIGH-TEMPERATURE PROPERTIES

This application is the U.S. national phase of International Patent Application No. PCT/ES2009/070444, filed Oct. 16, 2009.

The present invention relates to high-molecular-weight hydrogenated styrene/butadiene rubber grades, to a method of obtaining these products and to the uses thereof.

PRIOR STATE OF THE ART

Since their appearance approximately 40 years ago, thermoplastic elastomers (TPEs) have become a widely known family of materials which combine elastomeric properties with a great ease of processing, but which, by contrast, do not exhibit the thermal and elastic stability of vulcanized rubber. Most TPEs have a limited resistance to oils and ageing, primarily temperature-related. Thus, short- and long-time compression resistance values are moderate at ambient temperature, but poor at high temperatures.

Originally, vulcanized thermoplastics (TPVs) were solely based on totally or partially cross-linked EPDM (ethylene-propylene-diene monomer rubber) and a polypropylene matrix, but new trends and increasingly rigorous market demands (cost reduction, quality improvement, greater freedom of design, and legal and environmental requirements) have led to the consideration of new thermoplastic elastomers for the improvement of high-temperature properties.

Among all the alternatives disclosed for the improvement of high-temperature properties that incorporate hydrogenated rubbers, and having discarded the possibilities offered by the use of poly(p-phenylene) oxide, or PPO (odour and colour problems in the final compound), vulcanization with sulfur (formulation complexity) and generation of polyurethane in the compound (use of a polyisocyanate and presence of polymer functionalization), the most recent developments focus on dynamic vulcanization processes for compounds that incorporate high-molecular-weight hydrogenated styrene-butadiene/isoprene copolymers, as disclosed in document EP 1304356.

Compounds based on cross-linked hydrogenated block copolymers may have problems of insufficient compression resistance at high temperature (100° C.), a tendency to lose mechanical resistance, mouldability (processability) problems, low melting stress of the extrudate at high temperatures and limited conformational stability.

DESCRIPTION OF THE INVENTION

The present invention provides hydrogenated styrene/butadiene rubber grades with an improved high-temperature performance, which, in spite of having high molecular weight, show/reveal fewer problems associated with their synthesis and their processability/mouldability, as well as with their capacity to optimize the cross-linking scope in vulcanized formulations.

The advantages of the polymers in the present invention are primarily due to their viscosity, which is significantly lower than that of the polymers known in the state of the art. In practice, this constitutes an improvement in compression resistance for non-vulcanized formulations with respect to conventional hydrogenated styrene-butadiene-styrene copolymers, SEBS (styrene-ethylene/butylene-styrene copolymers) and high-molecular-weight SEBS, as well as for vulcanized formulations. This leads to an improvement in the processability of both the polymer and the compound prepared therewith, due to its lower viscosity with respect to the high-molecular-weight SEBS described thus far for this application, preserving and even improving its properties in the final application.

A first aspect of the present invention relates to an elastomeric thermoplastic composition characterized in that exhibits compression resistance at temperatures between 20° C. and 100° C., comprising hydrogenated styrene-butadiene block copolymers, where said copolymers are characterized by being linear or radial, with a vinyl content of less than 60% and a styrene content of between 30%-41%, with a molecular weight (MpeakSEBS) of between 200,000 and 600,000, expressed as the molecular weight of the peak of the styrene-ethylene/butylene-styrene triblock, as determined by GPC, using linear styrene-butadiene-styrene (SBS) triblock copolymer constants for the calculation for polymers with a linear structure and radial styrene-butadiene-styrene triblock copolymer constants for polymers with a radial structure, and with a viscosity of less than 300 cps, expressed as Brookfield viscosity at 5% by weight in cyclohexane.

In the present invention, thermoplastic is understood to mean a polymer that is plastic or deformable at ambient temperature, melts when heated and becomes hardened in a vitreous state when sufficiently cooled. Most thermoplastics are high-molecular-weight polymers, whose chains are connected by means of weak Van der Waals forces, strong dipole-dipole interactions and a hydrogen bond, or even stacked aromatic rings.

In the present invention, elastomer is understood to mean a substance that may be stretched at ambient temperature to at least twice its original length and, when the stretching force ceases, said compound is capable of returning to approximately its original length in a short period of time.

The composition of the present invention comprises at least one hydrogenated block copolymer obtained by the hydrogenation of a block copolymer composed of at least 2 blocks A, primarily based on aromatic vinyl compounds, preferably styrene, and at least one block B, primarily based on a conjugated diene, preferably butadiene. Examples of these hydrogenated block copolymers are copolymers of aromatic vinyl compounds and conjugated diene compounds with an A-B-A, B-A-B-A or A-B-A-B-A structure.

The aromatic vinyl monomers useful for the present invention include styrene, p-methylstyrene and p-tert-butylstyrene, styrene being the most preferred. They may be used by themselves or combined.

The conjugated diene monomers useful for the present invention include 1,3-butadiene, isoprene, 1,3-pentadiene and 2,3-dimethyl-1,3-butadiene, 1,3-butadiene being the most preferred. They may be used by themselves or combined.

The Brookfield viscosity is the apparent viscosity in centipoises (cps), determined by the Brookfield viscometer, which measures the torque required to rotate a spindle at constant velocity in a polymer solution in toluene. The method used in the present invention is based on the method of the American Society for Testing and Materials ASTM D3236; used to measure oil viscosities at low temperatures.

The method selected to determine the material's recovery capacity is the compression set method in accordance with standard ASTM D395 82 (method B: compression set under constant deflection). The compression sets are intended to measure the ability of rubber compounds to maintain elastic properties after the prolonged action of compression stress. Current compression tests include maintaining a defined deviation, the constant application of a known force or rapid, repeated deflections, and the resulting recovery of intermittent compression forces. These tests are frequently performed at high temperatures.

In a preferred embodiment, the elastomeric thermoplastic composition of the present invention comprises hydrogenated styrene-butadiene block copolymers characterized in that the vinyl content is less than 45%.

In another preferred embodiment, the elastomeric thermoplastic composition of the present invention comprises hydrogenated styrene-butadiene block copolymers characterized in that they have a molecular weight (Mpeak SEBS) of between 420,000 and 575,000. In a more preferred embodiment, said hydrogenated styrene-butadiene block copolymers have a molecular weight of between 420,000 and 475,000.

In another preferred embodiment, the elastomeric thermoplastic composition of the present invention comprises hydrogenated styrene-butadiene block copolymers characterized in that they have a viscosity (Brookfield viscosity at 5% by weight in cyclohexane) of less than 100 cps.

In another preferred embodiment, the elastomeric thermoplastic composition of the present invention comprises hydrogenated styrene-butadiene block copolymers characterized in that the degree of hydrogenation is equal to or greater than 97%.

In another preferred embodiment, the elastomeric thermoplastic composition of the present invention comprises hydrogenated styrene-butadiene block copolymers characterized in that they incorporate between 0.4% and 2% by total weight of butadiene as the minority monomer at the styrene end blocks.

In another preferred embodiment, the elastomeric thermoplastic composition of the present invention comprises a hydrogenated styrene-butadiene block copolymer characterized in that it is radial, has a vinyl content of less than 45%, a molecular weight (Mpeak SEBS) of between 420,000 and 575,000, and a viscosity (Brookfield viscosity at 5% by weight in cyclohexane) of less than 300 cps.

In another preferred embodiment, the elastomeric thermoplastic composition of the present invention comprises a hydrogenated styrene-butadiene block copolymer characterized in that it is linear, has a vinyl content of less than 45%, a molecular weight (Mpeak SEBS) of between 200,000 and 240,000, a viscosity (Brookfield viscosity at 5% by weight in cyclohexane) of less than 100 cps and, moreover, incorporates between 0.5% and 1% by total weight of butadiene as the minority monomer at the styrene end blocks.

In another preferred embodiment, the elastomeric thermoplastic composition of the present invention comprises a hydrogenated styrene-butadiene block copolymer characterized in that it is radial, has a vinyl content of less than 45%, a molecular weight (Mpeak SEBS) of between 420,000 and 575,000, a viscosity (Brookfield viscosity at 5% by weight in cyclohexane) of less than 300 cps and, moreover, incorporates between 0.5% and 1% by total weight of butadiene as the minority monomer at the styrene end blocks.

In another preferred embodiment, the elastomeric thermoplastic composition of the present invention comprises a hydrogenated styrene-butadiene block copolymer characterized in that it is linear, has a vinyl content of between 50%-55%, a molecular weight (Mpeak SEBS) of between 300,000 and 350,000, and a viscosity (Brookfield viscosity at 5% by weight in cyclohexane) of less than 100 cps.

A second aspect of the present invention relates to a linear or radial hydrogenated styrene-butadiene block copolymer that may be obtained by anionic polymerization of a block copolymer that comprises at least two aromatic vinyl monomer blocks and a conjugated diene monomer block, and subsequent hydrogenation, characterized in that it has a vinyl content of less than 60%, a molecular weight of between 200,000 and 600,000, and a viscosity of less than 300 cps.

Preferably, the hydrogenated styrene-butadiene block copolymer described above has a vinyl content of less than 45%.

Preferably, the hydrogenated styrene-butadiene block copolymer described above has a molecular weight (Mpeak SEBS) of between 420,000 and 575,000. More preferably, said copolymer has a molecular weight of between 420,000 and 475,000.

In a preferred embodiment of the present invention, the hydrogenated styrene-butadiene block copolymer described above has a viscosity (Brookfield viscosity at 5% by weight in cyclohexane) of less than 100 cps.

In a preferred embodiment of the present invention, the hydrogenated styrene-butadiene block copolymer described above has a degree of hydrogenation preferably equal to or greater than 97%.

In a preferred embodiment, the hydrogenated styrene-butadiene block copolymer described above incorporates between 0.4% and 2% by total weight of butadiene as the minority monomer at the styrene end blocks.

Another preferred embodiment of the present invention relates to a hydrogenated styrene-butadiene block copolymer characterized in that it is radial, has a vinyl content of less than 45%, a molecular weight of between 420,000 and 575,000, and a viscosity of less than 300 cps.

Another preferred embodiment of the present invention relates to a hydrogenated styrene-butadiene block copolymer characterized in that it is linear, has a vinyl content of less than 45%, a molecular weight of between 200,000 and 240,000, a viscosity of less than 100 cps and, moreover, incorporates between 0.5% and 1% by total weight of butadiene as the minority monomer at the styrene end blocks.

Another preferred embodiment of the present invention relates to a hydrogenated styrene-butadiene block copolymer characterized in that it is radial, has a vinyl content of less than 45%, a molecular weight of between 420,000 and 575,000, a viscosity of less than 300 cps and, moreover, incorporates between 0.5% and 1% by total weight of butadiene as the minority monomer at the styrene end blocks.

Another preferred embodiment of the present invention relates to a hydrogenated styrene-butadiene block copolymer characterized in that it is linear, has a vinyl content of between 50%-55%, a molecular weight of between 300,000 and 350,000, and a viscosity of less than 100 cps.

A more preferred embodiment of the present invention relates to a family of copolymers that may be obtained, as described in example 1, from SEBS-1, which is a high-molecular-weight hydrogenated radial styrene-butadiene block copolymer characterized in that it has a styrene content (% weight) of between 30 and 41, with a 1,2-polybutadiene fraction content in the non-hydrogenated styrene-butadiene copolymer precursor (% weight over butadiene fraction) of 38±2, with a degree of hydrogenation (%) greater than 97, with a molecular weight (Mpeak SEBS) of 525,000±50,000, with coupling (%) >60%, number of branches: 3-4, and coupling with silicon tetrachloride.

Another more preferred embodiment of the present invention relates to a family of copolymers that may obtained, as described in example 2, from SEBS-2, which is a high-molecular-weight hydrogenated linear styrene-butadiene block copolymer characterized in that it has butadiene at the styrene end blocks, with a styrene content (% weight) of between 31 and 35, with a 1,2-polybutadiene fraction content in the non-hydrogenated copolymer precursor (% weight over butadiene fraction) of 38±2, with a degree of hydrogenation (%) greater than 99, with a molecular weight (Mpeak SEBS) of 220,000±20,000, with a distribution of butadiene in the three blocks (%) of 1-98-1, and a styrene block content in the non-hydrogenated copolymer precursor (%) greater than 75.

Another more preferred embodiment of the present invention relates to a family of copolymers that may be obtained, as described in example 3, from SEBS-3, which is a high-molecular-weight hydrogenated radial styrene-butadiene block copolymer characterized in that it has butadiene at the styrene end blocks, with a styrene content (% weight) of between 31 and 35, a 1,2-polybutadiene fraction content in the non-hydrogenated copolymer precursor (% weight over butadiene fraction) of 38±2, with a degree of hydrogenation (%) greater than 97, with a molecular weight (Mpeak SEBS) of 450,000±25,000, with coupling (%) greater than 60, with a number of branches of 3-4, and coupling with silicon tetrachloride. The distribution of butadiene in the three blocks (%) is 1-98-1 and the styrene block content in the non-hydrogenated copolymer precursor (%) is greater than 80.

Another more preferred embodiment of the present invention relates to a family of copolymers that may be obtained, as described in example 4, from SEBS-4, which is a high-molecular-weight hydrogenated linear styrene-butadiene block copolymer characterized in that it has a styrene content (% weight) of between 31 and 35, a 1,2-polybutadiene fraction content in the non-hydrogenated copolymer precursor (% weight over butadiene fraction) of 50-55, a degree of hydrogenation (%) greater than 99 and a molecular weight (Mpeak SEBS) of 325,000±25,000.

A third aspect of the present invention relates to a method of obtaining a copolymer as described above, comprising:
  a. anionic polymerization of a block copolymer that comprises at least two aromatic vinyl monomer blocks and one conjugated diene monomer block,
  b. hydrogenation of the product obtained in (a).

The block copolymers of the present invention were synthesized by the anionic polymerization of styrene (and, optionally, butadiene) and butadiene in a sequential manner (in order to obtain linear polymers) or by means of a coupling agent (in order to obtain radial polymers) in cyclohexane, using n-butyllithium as the polymerization primer and an ether-type substance to control the vinyl content in the butadiene fraction. The block copolymers thus obtained are subjected to a hydrogenation reaction for 1 hour at 90° C. in a hydrogen atmosphere (10 kg/cm$^2$) using a titanium metallocene catalyst in tetrahydrofuran to obtain the corresponding hydrogenated block copolymers.

Once the different monomers have been sequentially incorporated and the styrene-butadiene block copolymer synthesis steps have been completed, the live chains are terminated by incorporating a proton-donor substance (2,6-ditertbutyl-4-methyl phenol: BHT). Once the termination step is completed, the hydrogenation is performed in the presence of a titanium metallocene catalyst, controlling the temperature, the pressure and the hydrogen consumption flow rate during the hydrogenation.

A fourth aspect of the present invention relates to a method of obtaining a composition as described above, which comprises mixing a copolymer as described above, a thermoplastic resin, a plasticizer agent and a stabilizer.

The lower viscosity of these copolymers as compared to the high-molecular-weight linear SEBS previously described for this application leads to a significant improvement in the finishing process, a significant reduction in the lower-size fraction content (fines) and a minimization of the problems that the treatment thereof entails. The preparation of a compound by melt extrusion using polymers with a lower viscosity entails significant advantages in parameters associated with improvement of the flow and a better dispersion of the different components in the mixture (lower melt viscosity).

Preferably, the thermoplastic resin is polypropylene. This resin causes an acceleration of the dispersion of the rubber in the formulation, in addition to improving the appearance of the finished product, whilst also adjusting the hardness and the swelling.

Preferably, the plasticizer agent is a paraffinic oil. This plasticizer agent facilitates the processability, whilst adjusting mouldability, hardness and softness parameters.

The plasticizer agents suitable to perform this method are preferably paraffinic oils with, preferably, a kinematic viscosity of between 20-50,000 csk at 37.8° C.; 5-1,500 csk at 100° C., pour point between −10° C. and 15° C., and flash point between 170° C.-300° C. (Pionier 2071, Kristol M70, Primol 352 oils, etc.).

In a preferred embodiment, in the method described above, a vulcanization agent and a vulcanization co-agent are also mixed.

The vulcanization process consists of producing a thermoplastic elastomer by selective cross-linking of the flexible stage of an elastomer during the mixing thereof with an immiscible thermoplastic matrix. In order to optimize the material's physical properties and mouldability, it is advisable to perform the first half of the extrusion process at a temperature whereat the half-life of the organic peroxide is equal to or greater than half the extrusion time, with the temperature of the second half of the extrusion time being such that the half-life of the peroxide is lower than half the total extrusion time. The mixing and melting method is performed in a double-spindle extruder at a temperature range between 160° C. and 220° C.

Preferably, the vulcanization agent is an organic peroxide selected from dicumyl peroxide and 2,5-dimethyl-2,5-di(t-butylperoxy)hexane.

Preferably, the vulcanization co-agent is a multi-functional vinyl monomer. More preferably, the vulcanization co-agent is triallylisocyanurate or triethylene glycol dimethacrylate.

A fifth aspect of the present invention relates to a product obtained by the injection moulding or extrusion of a composition as that described above.

These products have numerous applications, such as, but not limited thereto, numerous applications in the automobile sector (door handles, lateral protection systems, filters and oil hydraulic accessories, aeration tubes and hoses, window and door contours), construction (window contours, insulation, gaskets) and utensils for home use (hermetic container lids), the manufacturing of medical utensils, such as catheters, wire coatings, etc.

Throughout the description and the claims, the word "comprises" and the variants thereof are not intended to exclude other technical characteristics, additives, components or steps. For those skilled in the art, other objects, advantages and characteristics of the invention will arise partly from the description and partly from the practice of the invention. The following examples and drawings are provided for illustrative purposes, and are not intended to limit the scope of the present invention.

EXAMPLES

The invention will be illustrated below by means of assays performed by the inventors, which demonstrate the specificity and effectiveness of the products of the present invention.
  1. Characteristics of the Synthesized Products:

Polymer A: SEBS-1: High-Molecular-Weight Hydrogenated Radial Styrene-Butadiene Block Copolymer.

Styrene content (% weight): 30-41. 1,2-polybutadiene fraction content in non-hydrogenated styrene-butadiene copolymer precursor (% weight over butadiene fraction): 38±2. Hydrogenation (%): >97. Molecular weight (Mpeak SEBS): 525,000±50,000. Coupling (%): >60. Number of branches: 3-4. Coupling with silicon tetrachloride. Solution viscosity (expressed as Brookfield Viscosity—5%): <300 cps.

Polymer B1: SEBS-2: High-Molecular-Weight Hydrogenated Linear Styrene-Butadiene Block Copolymer with Butadiene at the Styrene End Blocks.

Styrene content (% weight): 31-35. 1,2-polybutadiene fraction content in non-hydrogenated copolymer precursor (% weight over butadiene fraction): 38±2. Hydrogenation (%): >99. Molecular weight (Mpeak SEBS): 220,000±20,000. Distribution of butadiene in the three blocks (%): 1-98-1. Styrene block in non-hydrogenated copolymer precursor (%): >75. Solution viscosity (expressed as Brookfield Viscosity—5%): <100 cps.

Polymer B2: SEBS-3: High-Molecular-Weight Hydrogenated Radial Styrene-Butadiene Block Copolymer with Butadiene at the Styrene End Blocks.

Styrene content (% weight): 33±2. 1,2-polybutadiene fraction content in non-hydrogenated copolymer precursor (% weight over butadiene fraction): 38±2. Hydrogenation (%): >97. Molecular weight (Mpeak SEBS): 450,000±25,000. Coupling with silicon tetrachloride (%): >60. Number of branches: 3-4. Distribution of butadiene in the three blocks (%): 1-98-1. Styrene block in non-hydrogenated copolymer precursor (%): >80. Solution viscosity (expressed as Brookfield Viscosity—5%): <300 cps.

Polymer C: SEBS-4: High-Molecular-Weight Hydrogenated Linear Styrene-Butadiene Block Copolymer.

Styrene content (% weight): 33±2. 1,2-polybutadiene fraction content in non-hydrogenated copolymer precursor (% weight over butadiene fraction): 50-55. Hydrogenation (%): >99. Molecular weight (Mpeak SEBS): 325,000±25,000. Solution viscosity (expressed as Brookfield Viscosity—5%): <100 cps.

2. Synthesis Method:

The following are introduced into a stirred reactor (CSTR): cyclohexane as the solvent, styrene as the monomer, n-butyllithium as the primer and a polar modifier (tetrahydrofuran, 1,2-diethoxypropane or ditetrahydrofuryl propane) in a sufficient concentration to reach the target vinyl and block levels.

SEBS-1 and SEBS-3: 100% of the total styrene in the copolymer.

SEBS-2 and SEBS-3: In this first step, a controlled quantity of butadiene (1% of the total butadiene) is added to the reactor as the minority monomer for the controlled incorporation thereof along the styrene end block.

SEBS-2 and SEBS-4: 50% of the total styrene in the copolymer.

The polymerization is allowed to take place at a temperature of 65° C., with the total time of the step never being greater than 35 minutes, controlling the temperature peak associated with the polymerization of styrene.

Once the polymerization of styrene is concluded, butadiene is added to the reactor and the polymerization is allowed to take place for a time determined as 10 minutes after the maximum temperature peak.

SEBS-1 and SEBS-4: 100% of the total butadiene in the copolymer.

SEBS-2 and SEBS-3: The incorporated butadiene corresponds to 98% of the total quantity in the copolymer.

Once the polymerization of butadiene is concluded,

SEBS-1 and SEBS-3, the coupling agent (silicon tetrachloride) is added and the coupling reaction is allowed to take place at a temperature range of 70° C.-90° C. for 30 minutes.

SEBS-2: styrene (50% of the total) and butadiene (1% of the total) are simultaneously incorporated into the reactor.

SEBS-4: styrene (50% of the total) is incorporated.

Once the different monomers have been sequentially incorporated and the styrene-butadiene block copolymer synthesis steps have been completed, the live chains are terminated by incorporating a proton-donor substance (2,6-ditertbutyl-4-methyl phenol: BHT) into the reaction medium.

Once the termination step is completed, the hydrogenation is performed in the presence of a titanium metallocene catalyst, controlling the temperature, the pressure and the hydrogen consumption flow rate during the hydrogenation.

Example 1

SEBS-1

The following are introduced into a stirred reactor (CSTR): cyclohexane (6,509 g) as the solvent, styrene (1,371 g of a 25% by weight solution) as the monomer (9% solids), n-butyllithium as the primer and a polar modifier (1,2-diethoxypropane) in a sufficient concentration (200 ppm) to reach the target vinyl levels.

The polymerization is allowed to take place at a temperature of 65° C., with the total time of the step never being greater than 30 minutes, controlling the temperature peak associated with the polymerization of styrene. Once the polymerization of styrene is concluded, butadiene (682 g) is added to the reactor and the polymerization is allowed to take place for a time determined as 10 minutes after the maximum temperature peak. Once the polymerization of butadiene is concluded, the coupling agent (silicon tetrachloride) is added in a molar ratio of 0.3 with respect to active lithium and the coupling reaction is allowed to take place at a temperature range between 70° C.-90° C. for 30 minutes. Subsequently, the living chains are terminated by incorporating a proton-donor substance (BHT) to the reaction medium.

Once the termination step is completed, the hydrogenation is performed in the presence of a titanium metallocene catalyst [mmol catalyst/100 g butadiene ratio: 0.45], controlling the temperature (90° C.), the pressure (10 kg/cm$^2$) and the hydrogen consumption flow rate during the hydrogenation.

| SAMPLE | Ref. 1 | Ref. 2 | SEBS-1/1 | SEBS-1/2 | SEBS-1/3 | SEBS-1/4 |
| --- | --- | --- | --- | --- | --- | --- |
| Styrene (%) | 31.3 | 30.6 | 30.5 | 32.5 | 40.9 | 33.4 |
| Vinyl (%) | 36.4 | 38.9 | 40.2 | 36.6 | 38.8 | 35.8 |
| Hydrogenation (%) | 99.8 | 99.5 | 97.7 | 99.4 | 99.6 | 99.9 |

-continued

| SAMPLE | Ref. 1 | Ref. 2 | SEBS-1/1 | SEBS-1/2 | SEBS-1/3 | SEBS-1/4 |
|---|---|---|---|---|---|---|
| Mpeak SEBS | 184,167 | 346,000 | 542,525 | 572,230 | 476,508 | 505,474 |
| Coupling (%) | — | — | 68 | 64 | 64 | 74 |
| No. branches | — | — | 3.4 | 3.8 | 3.6 | 4.0 |
| BV-5% (cps) | BV-10%: 2,000 cps | 465 | 294 | 167 | 266 | 122 |
| NON-VULCANIZED COMPOUND: SEBS (100)phr + PP (25)phr + OIL (100)phr | | | | | | |
| Compression Resistance (%) 100° C.-22 h-25% deflection | 55 | 48 | 47 | 48 | 49 | 47 |
| VULCANIZED COMPOUND: SEBS (100)phr + PP(25)phr + OIL (100)phr + PEROXIDE (3)phr + TAIC (3)phr | | | | | | |
| Compression Resistance 100° C.-22 h-25% deflection | 41 | 30 | 35 | 33 | 44 | 39 |

In order to prepare the different formulations, the rubber is first physically mixed with the oil, reserving a controlled quantity of said oil if the mixture is to be vulcanized, in order to disperse both the cross-linking agent and the cross-linking co-agent therein. Subsequently, polypropylene and a phenol-type antioxidant are added at a concentration of 0.2% by weight.

The compounding technique used to prepare the different formulations is single-step dynamic vulcanization in a double-spindle extruder. The increasing temperature profile is set between 180° C.-205° C. and the spindle velocity at 150 rpm, in order to ensure the mixing and the vulcanization in the first and second halves of the extruder, respectively.

The method selected to determine the material's recovery capacity is the compression set method in accordance with standard ASTM D395 82 (method B: compression set under constant deflection).

Example 2

SEBS-2

The following are introduced into a stirred reactor (CSTR): cyclohexane (5,638 g) as the solvent, styrene (810 g of a 25% by weight solution) and butadiene (10 ml) as the co-monomers, n-butyllithium as the primer and a polar modifier (1,2-diethoxypropane) at a sufficient concentration (200 ppm) to reach the target vinyl and block levels.

The polymerization is allowed to take place at a temperature of 70° C., with the total time of the step never being greater than 35 minutes, controlling the temperature peak associated with the polymerization of styrene. Once the polymerization of styrene is concluded, butadiene (619 g) is added to the reactor and the polymerization is allowed to take place for a time determined as 10 minutes after the maximum temperature peak. Once the polymerization of butadiene is concluded, styrene (810 g of a 25% by weight solution) and butadiene (10 ml) are simultaneously introduced into the reactor as the co-monomers. Once the different monomers have been sequentially incorporated and the styrene-butadiene block copolymer synthesis steps have been completed, the living chains are terminated by incorporating a proton-donor substance (BHT) into the reaction medium.

Once the termination step is completed, the hydrogenation is performed in the presence of a titanium metallocene catalyst [mmol catalyst/100 g butadiene ratio: 0.45], controlling the temperature (90° C.), the pressure (10 kg/cm$^2$) and the hydrogen consumption flow rate during the hydrogenation.

| SAMPLE | Reference 1 | Reference 2 | SEBS-2 |
|---|---|---|---|
| Styrene (%) | 31.3 | 30.6 | 33.0 |
| Styrene block (%) | 99.8 | 97.6 | 79.0 |
| Vinyl (%) | 36.4 | 38.9 | 39.0 |
| Hydrogenation (%) | 99.8 | 99.5 | 100 |
| Mpeak SEBS | 184,167 | 346,000 | 226,870 |
| BV-5% (cps) | BV-10%: 2,000 cps | 465 | 63 (BV-10%: 2,272 cps) |
| NON-VULCANIZED COMPOUND: SEBS (100) phr + PP (25) phr + OIL (100) phr | | | |
| Compression Resistance (%) 100° C.-22 h-25% deflection | 55 | 48 | 64 |
| VULCANIZED COMPOUND: SEBS (100) phr + PP(25) phr + OIL (100) phr + PEROXIDE (3) phr + TAIC (3) phr | | | |
| Compression Resistance 100° C.-22 h-25% deflection | 41 | 30 | 36 |

In order to prepare the different formulations, the rubber is first physically mixed with the oil, reserving a controlled quantity of said oil if the mixture is to be vulcanized, in order to disperse both the cross-linking agent and the cross-linking co-agent therein. Subsequently, polypropylene and a phenol-type antioxidant are added at a concentration of 0.2% by weight.

Example 3

SEBS-3

The following are introduced into a stirred reactor (CSTR): cyclohexane (5,526 g) as the solvent, styrene (1,292 g of a 25% by weight solution) and butadiene (10 ml) as the co-monomers, n-butyllithium as the primer and a polar modifier (1,2-diethoxypropane) at a sufficient concentration (200 ppm) to reach the target vinyl and block levels. The polymerization is allowed to take place at a temperature of 65° C., with the total time of the step never being greater than 30 minutes, controlling the temperature peak associated with the polymerization of styrene. Once the polymerization of styrene is concluded, butadiene (675 g) is added to the reactor and the polymerization is allowed to take place for a time determined as 10 minutes after the maximum temperature peak. Once the polymerization of butadiene is concluded, the coupling agent (silicon tetrachloride) is added in a molar ratio of 0.3 with respect to active lithium and the coupling reaction is allowed to take place at a temperature range between 70° C.-90° C. for 30 minutes. Subsequently, the living chains are terminated by incorporating a proton-donor substance (BHT) into the reaction medium.

Once the termination step is completed, the hydrogenation is performed in the presence of a titanium metallocene catalyst [mmol catalyst/100 g butadiene ratio: 0.45], controlling the temperature (90° C.), the pressure (10 kg/cm$^2$) and the hydrogen consumption flow rate during the hydrogenation.

| SAMPLE | Reference 1 | Reference 2 | SEBS-3 |
|---|---|---|---|
| Styrene (%) | 31.3 | 30.6 | 30.5 |
| Styrene block | 99.8 | 97.6 | 96.4 |
| Vinyl (%) | 36.4 | 38.9 | 40.2 |
| Hydrogenation (%) | 99.8 | 99.5 | 97.7 |
| Mpx10-3 (ctes C416 linear) | 184,167 | 346,000 | 469,938 |
| Coupling (%) | — | — | 68 |
| No. branches | — | — | 3.4 |
| BV-5% (cps) | BV-10%: 2,000 cps | 465 | 294 |
| NON-VULCANIZED COMPOUND: SEBS (100) phr + PP (25) phr + OIL (100) phr | | | |
| Compression Resistance (%) 100° C.-22 h-25% deflection | 55 | 48 | 50 |
| VULCANIZED COMPOUND: SEBS (100) phr + PP(25) phr + OIL (100) phr + PEROXIDE (3) phr + TAIC (3) phr | | | |
| Compression Resistance 100° C.-22 h-25% deflection | 41 | 30 | 44 |

In order to prepare the different formulations, the rubber is first physically mixed with the oil, reserving a controlled quantity of said oil if the mixture is to be vulcanized, in order to disperse both the cross-linking agent and the cross-linking co-agent therein. Subsequently, polypropylene and a phenol-type antioxidant are added at a concentration of 0.2% by weight.

Example 4

SEBS-4

The following are introduced into a stirred reactor (CSTR): cyclohexane (5,680 g) as the solvent, styrene (685 g of a 25% by weight solution) as the monomer, n-butyllithium as the primer and a polar modifier (ditetrahydrofuryl propane) at a sufficient concentration (100 ppm) to reach the target vinyl and block levels. The polymerization is allowed to take place at a temperature of 60° C., with the total time of the step never being greater than 30 minutes, controlling the temperature peak associated with the polymerization of styrene. Once the polymerization of styrene is concluded, butadiene (699 g) is added to the reactor and the polymerization is allowed to take place for a time determined as 10 minutes after the maximum temperature peak. Once the polymerization of butadiene is concluded, styrene (685 g of a 25% by weight solution) is incorporated. Once the different monomers have been sequentially incorporated and the styrene-butadiene block copolymer synthesis steps have been completed, the living chains are terminated by incorporating a proton-donor substance (BHT) into the reaction medium.

Once the termination step is completed, the hydrogenation is performed in the presence of a titanium metallocene catalyst [mmol catalyst/100 g butadiene ratio: 0.45], controlling the temperature (90° C.), the pressure (10 kg/cm$^2$) and the hydrogen consumption flow rate during the hydrogenation.

| SAMPLE | Reference 1 | Reference 2 | SEBS-4 |
|---|---|---|---|
| Styrene (%) | 31.3 | 30.6 | 32.5 |
| Vinyl (%) | 36.4 | 38.9 | 53.6 |
| Hydrogenation (%) | 99.8 | 99.5 | 99.6 |
| Mpeak SEBS | 184,167 | 346,000 | 303,427 |
| BV-5% (cps) | BV-10%: 2,000 cps | 465 | 52 |
| NON-VULCANIZED COMPOUND: SEBS (100) phr + PP (25) phr + OIL (100) phr | | | |
| Compression Resistance (%) 100° C.-22 h-25% deflection | 55 | 48 | 45 |
| VULCANIZED COMPOUND: SEBS (100) phr + PP(25) phr + OIL (100) phr + PEROXIDE (3) phr + TAIC (3) phr | | | |
| Compression Resistance 100° C.- 22 h-25% deflection | 41 | 30 | 26 |

In order to prepare the different formulations, the rubber is first physically mixed with the oil, reserving a controlled quantity of said oil if the mixture is to be vulcanized, in order to disperse both the cross-linking agent and the cross-linking co-agent therein. Subsequently, polypropylene and a phenol-type antioxidant are added at a concentration of 0.2% by weight.

The invention claimed is:

1. An elastomeric thermoplastic composition having compression resistance at temperatures between 20° C. and 100° C., comprising hydrogenated styrene-butadiene block copolymers, wherein the copolymers are linear or radial, having a vinyl content of less than 60%, a styrene content between 30% and 41%, a molecular weight of between 200,000 and 600,000 and a viscosity of less than 300 cps.

2. The elastomeric thermoplastic composition as claimed in claim 1, wherein the vinyl content of the copolymers is less than 45%.

3. The elastomeric thermoplastic composition as claimed in claim 1, wherein the molecular weight of the copolymers is between 420,000 and 575,000.

4. The elastomeric thermoplastic composition as claimed in claim 3, have a wherein the molecular weight of the copolymers is between 420,000 and 475,000.

5. The elastomeric thermoplastic composition as claimed in claim 1, wherein the viscosity of the copolymers is less than 100 cps.

6. The elastomeric thermoplastic composition as claimed in claim 1, wherein the degree of hydrogenation of the copolymers is equal to or greater than 97%.

7. The elastomeric thermoplastic composition as claimed in claim 1, wherein the copolymers incorporate between 0.4% and 2% by total weight of butadiene as the minority monomer at the styrene end blocks.

8. The elastomeric thermoplastic composition as claimed in claim 1, wherein the copolymers are radial, and have a vinyl content of less than 45%, a molecular weight of between 420,000 and 575,000, and a viscosity of less than 300 cps.

9. The elastomeric thermoplastic composition as claimed in claim 1, wherein the copolymers are linear, have a vinyl content of less than 45%, a molecular weight of between 200,000 and 240,000, a viscosity of less than 100 cps, and incorporate between 0.5% and 1% by total weight of butadiene as the minority monomer at the styrene end blocks.

10. The elastomeric thermoplastic composition as claimed in claim 1, wherein the copolymers are radial, have a vinyl content of less than 45%, a molecular weight of between 420,000 and 575,000, a viscosity of less than 300 cps and, incorporate between 0.5% and 1% by total weight of butadiene as the minority monomer at the styrene end blocks.

11. The elastomeric thermoplastic composition as claimed in claim 1, wherein the copolymers are linear, and have a vinyl content of between 50% and 55%, a molecular weight of between 300,000 and 350,000, and a viscosity of less than 100 cps.

12. A hydrogenated linear or radial styrene-butadiene block copolymer obtained by anionic polymerization of a block copolymer comprising at least two aromatic vinyl monomer blocks and one conjugated diene monomer block, and subsequent hydrogenation; wherein the copolymer has a vinyl content of less than 60%, a molecular weight of between 200,000 and 600,000, and a viscosity of less than 300 cps.

13. The hydrogenated styrene-butadiene block copolymer as claimed in claim 12, wherein the vinyl content of the copolymer is less than 45%.

14. The hydrogenated styrene-butadiene block copolymer as claimed in claim 12, wherein the molecular weight of the copolymer is between 420,000 and 575,000.

15. The hydrogenated styrene-butadiene block copolymer as claimed in claim 14, wherein the molecular weight of the copolymer is between 420,000 and 475,000.

16. The hydrogenated styrene-butadiene block copolymer as claimed in claim 12, wherein the viscosity of the copolymer is less than 100 cps.

17. The hydrogenated styrene-butadiene block copolymer as claimed in claim 12, wherein the degree of hydrogenation of the copolymer is equal to or greater than 97%.

18. The hydrogenated styrene-butadiene block copolymer as claimed in claim 12, wherein the copolymer is radial, and has a vinyl content of less than 45%, a molecular weight of between 420,000 and 575,000, and a viscosity of less than 300 cps.

19. The hydrogenated styrene-butadiene block copolymer as claimed in claim 12, wherein the copolymer is linear, and has a vinyl content of between 50% and 55%, a molecular weight of between 300,000 and 350,000, and a viscosity of less than 100 cps.

20. The hydrogenated styrene-butadiene block copolymer as claimed in claim 12, wherein the copolymer incorporates between 0.4% and 2% by total weight of butadiene as the minority monomer at the styrene end blocks.

21. The hydrogenated styrene-butadiene block copolymer as claimed in claim 20, wherein the copolymer is radial, and has a vinyl content of less than 45%, a molecular weight of between 420,000 and 475,000, a viscosity of less than 300 cps and incorporates between 0.5% and 1% by total weight of butadiene as the minority monomer at the styrene end blocks.

22. The hydrogenated styrene-butadiene block copolymer as claimed in claim 20, wherein the copolymer is linear, and has a vinyl content of less than 45%, a molecular weight of between 200,000 and 240,000, a viscosity of less than 100 cps and incorporates between 0.5% and 1% by total weight of butadiene as the minority monomer at the styrene end blocks.

23. A method of obtaining an elastomeric thermoplastic composition, which comprises mixing
  (a) a hydrogenated linear or radial styrene-butadiene block copolymer as claimed in claim 12,
  (b) a thermoplastic resin,
  (c) a plasticizer agent and
  (d) a stabilizer,
wherein
  (i) the composition has compression resistance at temperatures between 20° C. and 100° C., and
  (ii) the hydrogenated styrene-butadiene block copolymer has a vinyl content of less than 60%, a styrene content between 30% and 41%, a molecular weight of between 200,000 and 600,000 and a viscosity of less than 300 cps.

24. The method as claimed in claim 23, where the thermoplastic resin is polypropylene.

25. The method as claimed in claim 23, where the plasticizer agent is a paraffinic oil.

26. The method as claimed in claim 23, further comprising adding a vulcanization agent and a vulcanization co-agent.

27. The method as claimed in claim 26, where the vulcanization agent is an organic peroxide selected from dicumyl peroxide and 2,5-dimethyl-2,5-di(t-butylperoxy)hexane.

28. The method as claimed in claim 26, where the vulcanization co-agent is a multi-functional vinyl monomer.

29. A product obtained by the injection moulding or extrusion of a composition as claimed in claim 1.

30. The method of claim 28, wherein the vulcanization co-agent is triallylisocyanurate or triethylene glycol dimethacrylate, or a combination thereof.

* * * * *